United States Patent Office 3,348,863
Patented Oct. 24, 1967

3,348,863
HOSE COUPLING
William R. Rinker, Cuyahoga Falls, Ohio, assignor to The
B. F. Goodrich Company, New York, N.Y., a corporation of New York
Filed Apr. 14, 1967, Ser. No. 630,938
9 Claims. (Cl. 285—252)

ABSTRACT OF THE DISCLOSURE

A mechanical coupling for flexible, thin-wall, elastomeric hose in which the end of the hose is turned outwardly over a tapered support sleeve and wedged intermediate the outer surface of the latter and an outer tapered sleeve that is prevented from displacement by a clamping band disposed about the hose and support sleeve.

Background of the invention

This invention relates to the provision of a coupling upon a thin-wall, flexible hose, in particular fabric reinforced, thin-wall, elastomeric hose of large internal diameter as compared to the wall thickness. Hose of this type is desirable for use in moderately high pressure service requiring large flow rates, for example, in surface irrigation. Since such hose must be light and readily flexible, a very thin wall is most desirable. However, great difficulty has been experienced in providing adequate strength in the attachment of such hose to couplings so that they will withstand the stresses to which they are subjected and also remain leak-free.

Summary of the invention

The present invention overcomes the above described difficulties by providing a hose coupling that is free of leaks and does not impair the mechanical integrity of the hose wall at the region of coupling attachment. This is achieved by passing the hose end through an intermediate tapered sleeve and turning the said end back on the outer surface of the sleeve on which it is wedged by an outer tapered sleeve. To facilitate this manipulation of the hose end, it is preferably longitudinally cut to form a plurality of strips and these are held on the intermediate tapered sleeve both by the outer sleeve and by a clamping band placed adjacent the small end of the tapered sleeve to prevent displacement thereof. This construction is such that increasing tension in the hose tends to wedge the turned back strips in the ends of the hose even more tightly between the intermediate tapered sleeve and the outer sleeve while the clamping band prevents retrograde movement of the outer sleeve when the tension is released. The hose, thus assembled upon the intermediate sleeve, is slipped over one end of an inner sleeve having elastomeric seals on the outer surface thereof for sealing in cooperation with the inner periphery of the hose. The other end of the inner sleeve may have a suitable configuration for engagement in a complementary coupling. Thus, the invention provides a means for attaching a thin-wall flexible elastomeric hose to a mechanical coupling so that the coupling does not damage the hose structure and tension in the hose tends to increase the locking force of the attachment.

Other novel features and advantages of the invention will be apparent from the following description of the presently preferred embodiment described with reference to the accompanying drawings forming a part of this application.

Detailed description

Figure 1:
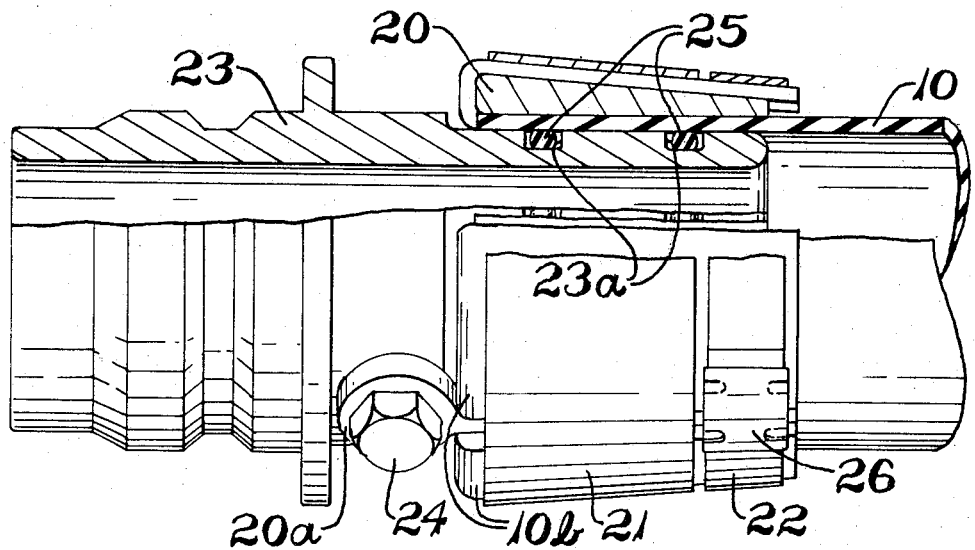
FIG. 1 is a side view of the presently preferred embodiment of the invention with a portion of the hose and coupling cut away to show the details of the coupling in partial cross-section; and, FIG. 2 is an isometric view of the end portion of a section of hose with the end prepared for assembly with the coupling.

Referring to FIG. 1, a section of large diameter, thin-wall, flexible, elastomeric hose 10, is shown with the end prepared for assembly with the coupling by having a plurality of evenly spaced, longitudinally extending, narrow recesses or slits 10a therein dividing the hose end into a plurality of axial end strips 10b. In the present embodiment of the invention, four of the strips are shown spaced at 90° intervals around the periphery.

Figure 2:
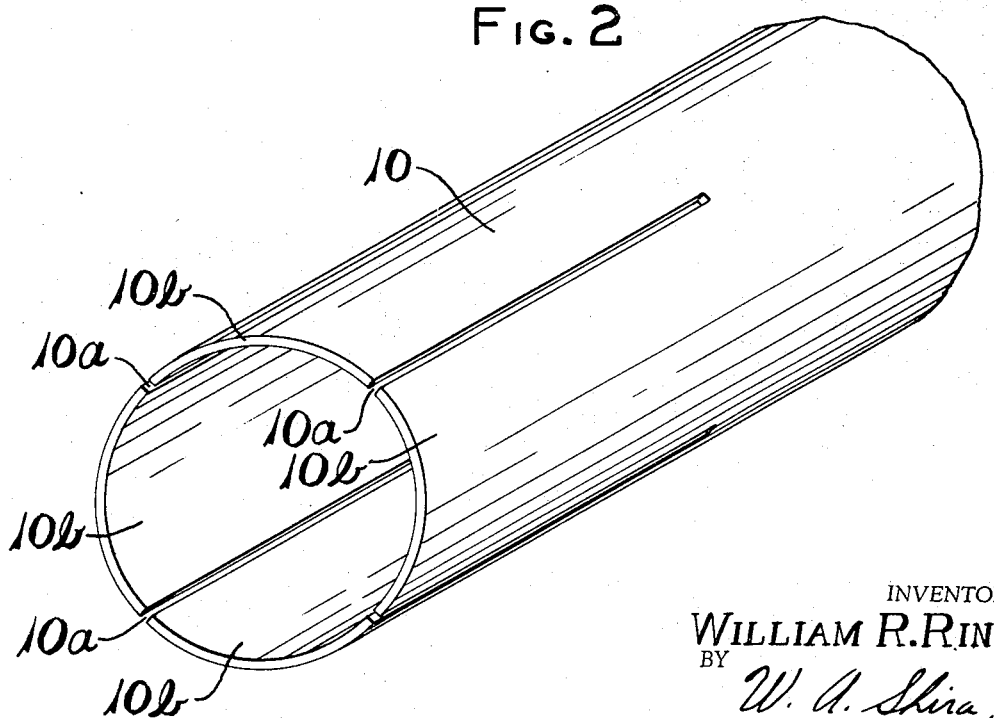

Referring now to FIG. 2, the hose 10 is shown assembled with the coupling. This is effected by passing the slit end of the hose through the bore of an externally tapered support sleeve and turning the hose back over the sleeve. The taper of the outer surface of the sleeve relative to its axis of revolution is preferably 4½° and the sleeve is of cadmium plated steel tubing, brass, or any other suitable corrosion resistant material. Mounting lugs 20a, at least three but preferably four in number, extend axially from the thicker edge of the sleeve 20 and are spaced evenly around the circumference of the sleeve. The circumferential spacing of the recesses or slits 10a in the hose corresponds to that of the lugs 20a and the hose is so positioned that the lugs extend between the strips 10b.

An outer sleeve 21 of frusto-conical configuration, tapered approximately 4½° to its axis of revolution, and having a uniform wall thickness, is slipped over the end of the hose prior to insertion thereof into the intermediate sleeve. This outer sleeve is then positioned over the turned back hose strips 10b, with the inside surface of the sleeve 21 making contact with the strips 10b along their lengths and clamping them to the intermediate sleeve. In the preferred embodiment, the outer sleeve is made of cadmium plated steel tubing, brass or any other suitable corrosion resistant material.

The inside diameter of the outer sleeve 21 is preferably such that it makes contact with the strips 10b when the larger diameter edge of the sleeve is spaced a short distance away from the thicker edge of support sleeve 20 so that sleeve 21 does not overhang the thicker edge of the support sleeve 20. Moreover, the outer sleeve 21 is preferably of lesser axial extent than the support sleeve 20, so that the ends of the turned back strips 10b extend axially beyond the smaller diameter edge of the outer sleeve when the latter has been manually moved toward the thicker end of the support sleeve and is seated firmly on the turned back hose strips.

A clamping band 22, preferably formed of a corrosion resistant material, is next placed over the ends of the strips 10b and the end of sleeve 20 where the strips extend beyond the outer sleeve 21. This band is then tightened clamping the strips 10b between the inside surface of the band and the outside surface of the support sleeve 20, the clamping band being secured in tightened condition by the locking means 26. Thus, the clamping band serves both as a retainer for holding the outer sleeve 21 in the seated position, preventing it from loosening from the wedged position over the hose strips, and also provides additional clamping of the hose strips. Although a permanently locked clamping band is illustrated in the drawings, if desirable, any of the several types of releasable and/or adjustable clamping bands may be used since the invention does not require any specific type of clamping band.

A coupling sleeve 23 is inserted into the end of the hose and is attached to the support sleeve 20 by fastening means 24. In the illustrated embodiment, the fastening means are machined screws which pass through the lugs 20a in the support sleeve 20 and engage threads in blind tapped holes in the outer diameter of the coupling sleeve 23. The sleeve 23 is preferably made of cadmium plated steel but may be made from brass or any other suitable corrosion resistant material. The portion of the coupling sleeve 23, inserted into the end of the hose, has its outer diameter formed to a dimension such that it will slip-fit closely with the inside diameter of the flexible hose, and means are provided to prevent leakage between the hose and sleeve 23. In the illustrated embodiment, at least one and preferably two grooves 23a are shown cut on the outside surface of the portion of sleeve 23 which is inserted into the hose. Within each of these grooves is an elastomeric seal 25 preferably in the form of an O ring, which forms a pressure-tight seal between the coupling sleeve and the inside surface of the flexible hose 10. Although O-rings are used in the present embodiment, other suitable sealing means may be used.

The preferred embodiment of the invention has been described as having releasable fasteners penetrating tabs 20a on the support sleeve as the means for attaching the coupling sleeve 23 to the support sleeve 20. Other releasable fastening means may be employed to secure the tabs to sleeve 23 or sleeves 20 and 23 may be secured by means not requiring projecting tabs in which event the coupled end of the hose need not be slit or otherwise be provided with openings to accommodate projecting tabs.

These and other modifications and adaptations of the invention can be made by those skilled in the art, the invention being limited only by the spirit and scope of the appended claims.

I claim:

1. The combination comprising: a thin wall flexible hose, a rigid cylindrical support sleeve having a uniform inside diameter and a uniformly axially tapering outer surface fitted over one end of said hose, the said hose having the end thereof passing through said sleeve and turned axially back over the outer surface of the latter, a rigid outer sleeve having an inner surface of frustoconical configuration generally complementary to the outer surface of the said support sleeve fitted over the turned-back portion of said hose wedging the latter between said outer sleeve and said support sleeve, a rigid coupling sleeve having one end of cylindrical configuration adapted to slip-fit into the inner diameter of said hose, seal means providing a fluid-tight seal between said hose and said coupling sleeve, and means releasably attaching the free end of said support sleeve to said coupling sleeve.

2. The combination defined in claim 1 further comprising clamping means for preventing axial displacement of said outer sleeve.

3. The combination defined in claim 2 wherein said clamping means is disposed over the said turned-back portion of said hose adjacent the smaller end of said outer sleeve in direct contact with said turned back portion and pressed against the outer surface of said support sleeve.

4. The combination defined in claim 1 wherein said means for attaching said support sleeve to said coupling sleeve comprises lug means on said support sleeve extending axially therefrom and through the turned back portion of said hose, and fastening means securing said lug means to said coupling sleeve.

5. The combination defined in claim 4 wherein the end of said hose has a plurality of axial slits made therein forming longitudinal strips for turning axially back over the outer surface of said support sleeve.

6. The combination defined in claim 5 wherein said means for attaching said support sleeve to said coupling sleeve comprises a plurality of lugs spaced equally around the periphery of said support sleeve and extending axially therefrom between said hose strips, and fastening means securing the said lugs to said coupling sleeve.

7. The combination defined in claim 1, wherein the outer surface of said support sleeve is tapered substantially 4½° to the axis of said coupling and the inner frusto-conical surface of said outer sleeve is tapered a like amount.

8. The combination in claim 1 wherein said coupling sleeve has at least one circumferential groove formed on the diameter adapted to slip fit into said hose, and said seal means is a ring of elastomeric material adapted to seal between said groove and the inside surface of said hose.

9. The combination defined in claim 8 wherein said seal means is an O-ring.

References Cited

UNITED STATES PATENTS

| 2,616,729 | 11/1952 | Hansen | 285—240 X |
| 3,115,353 | 12/1963 | Previati | 285—149 X |

FOREIGN PATENTS

| 955,498 | 4/1964 | Great Britain. |

CARL W. TOMLIN, *Primary Examiner.*

T. F. CALLAGHAN, *Assistant Examiner.*